Figure 1:
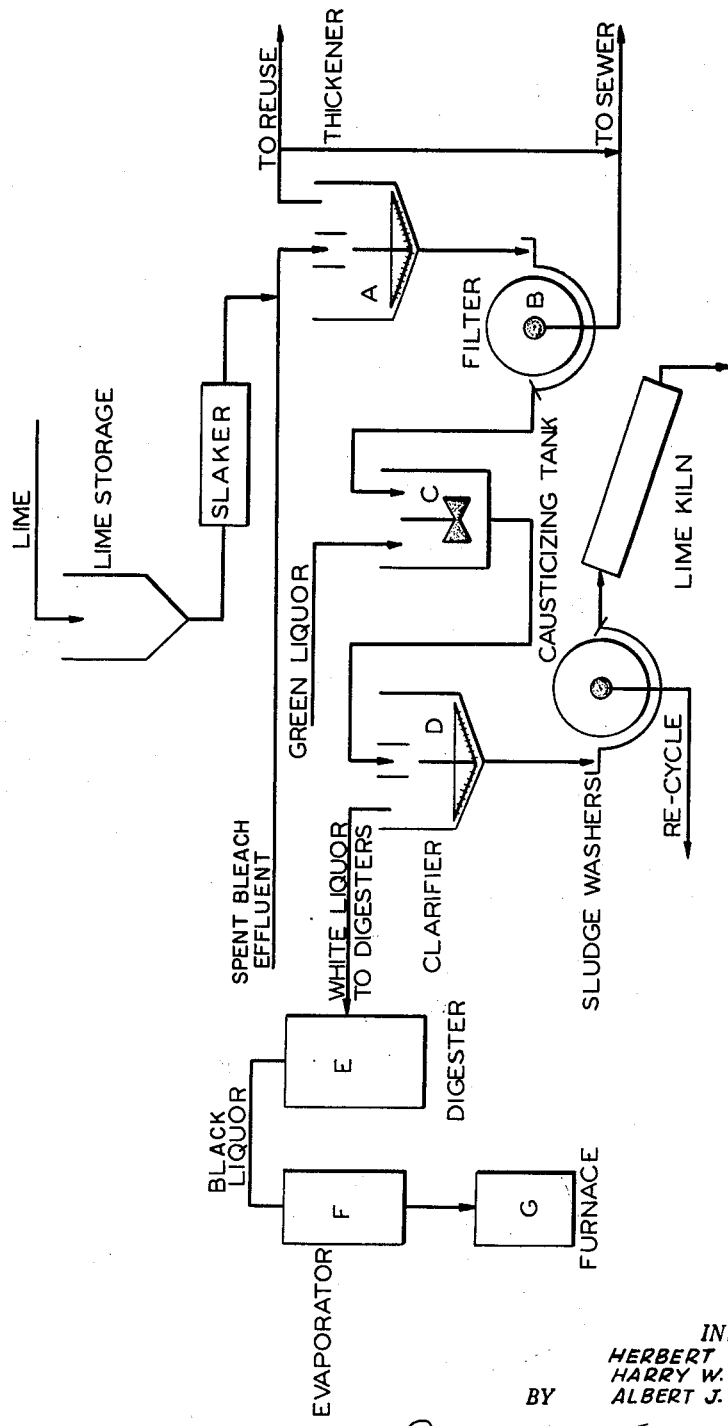

Feb. 4, 1964    H. F. BERGER ETAL    3,120,464
DECOLORIZING KRAFT WASTE LIQUORS
Filed Nov. 29, 1960    2 Sheets-Sheet 1

INVENTORS.
HERBERT F. BERGER
HARRY W. GEHM
BY  ALBERT J. HERBET

Davis, Hoxie, Faithfull & Hapgood
ATTORNEYS.

3,120,464
DECOLORIZING KRAFT WASTE LIQUORS
Herbert F. Berger, Baton Rouge, La., Harry W. Gehm, Annandale, N.J., and Albert J. Herbet, Baton Rouge, La., assignors to National Council For Stream Improvement (of the Pulp, Paper and Paperboard Industries) Inc., New York, N.Y., a corporation of Delaware
Filed Nov. 29, 1960, Ser. No. 72,415
5 Claims. (Cl. 162—33)

This invention relates to the removal of organic color bodies from caustic bleach waste liquors.

In bleaching pulp produced by the kraft process, the pulp is subjected to one of two general methods, namely (a) one-stage process which consists of treating the pulp with calcium hypochlorite bleach to produce a cream-colored paper or in the case where a white paper is desired, (b) a process is employed which involves treatment with free chlorine, neutralizing with caustic soda and then a bleach with calcium hypochlorite or chlorine dioxide. The chemicals in each case separate the colored lignins and tanins in the wood from the cellulose fiber and they are carried out with the wash water.

The pulping industry has long been plagued with the problem of colored liquid effluents from the bleaching process, especially when such effluents are discharged into streams or waters serving as municipal or industrial water sources.

This invention provides a method for removing the color bodies from the spent bleaching liquors and their ultimate burning in the recovery furnace of the kraft black liquors.

The method of this invention comprises admixing the bleaching effluent with the lime feed normally employed to causticize the green liquor in the kraft pulping process, thickening and dewatering the resulting lime-bleach effluent slurry and passing the dewatered filter cake containing the organic color bodies to the causticizer wherein the color bodies dissolve in the white liquor and subsequently pass through the digestion process. After digestion the color bodies become a part of the black liquor and are ultimately burned in the recovery furnace.

During the initial admixing of the bleach effluent and lime, the color bodies are adsorbed on the lime $(Ca(OH)_2)$. The filter cake formed by dewatering the bleach effluent-lime slurry is primarily calcium hydroxide containing the adsorbed color bodies. In the causticizer the calcium hydroxide reacts with the $Na_2CO_3$ present in the green liquor to form NaOH and thereby dissolving the color bodies. After causticizing, the dissolved color bodies are present in the white liquor and pass with this liquor through the pulp digestion process where they are ultimately burned with the black liquor.

The overflow from the thickening of the lime-bleach effluent slurry is a saturated solution of calcium hydroxide containing also extraneous salts such as NaCl and $Na_2SO_4$. This overflow may be employed in the lime slaking process thereby recovering some of the dissolved lime. This calcium hydroxide solution may likewise be used in preparing the hypochlorite solution for bleaching or for other uses in the pulp mill, woodyard or by-products plants which are obvious to those skilled in the art or the lime recovered from it by recarbonation or similar procedure.

The filtrate from the dewatering operation is of the same composition as the overflow from the thickener and thus may be combined with the overflow stream.

The presence of color bodies in the white liquor does not adversely affect the settling properties of the lime-mud in the white liquor clarifier. Furthermore, since most of the chloride present in the bleach effluent is dissolved in the thickener and filter, together with the fact that the organic color bodies hold very little chlorine in combination, only a small accumulation of chlorides occurs in the liquor system which accumulation does not rise to undesirable levels.

FIG. 1 is a flow diagram of the process of this invention which may be used to decolorize caustic bleach extract and the incorporation of the decolorization step in the black liquor recovery step.

In FIG. 1 the caustic extract bleachery waste water and slaked lime are introduced into the thickener A. The underflow from thickener A is further dewatered in filter B. The filter cake from filter B is then passed to the causticizing tank C wherein it is admixed with green liquor from the black liquor recovery process. The filtrate from causticizing tank C containing the color bodies is then passed to clarifier D. The overflow from clarifier D (white liquor) containing the color bodies is then passed to the digesters E. The black liquor from digesters E is first concentrated in evaporator F and then passed to the furnace G wherein the color bodies are destroyed. As known in the art the furnace G produces a smelt of the inorganic materials present in the black liquor, which smelt subsequently is dissolved in a liquid medium which may be mildly caustic forming the green liquor. The kraft process is described in Shreve's Selected Process Industries (published by McGraw-Hill Book Company, Inc., 1950), beginning at page 638. We have found that upwards of 90% of the color bodies may be removed from the caustic extract bleach effluent by admixing approximately 600 lbs. of slaked lime per 6000 gallons of effluent at a temperature of about 100–150° F.

While the temperature is not critical insofar as removal of color bodies from the effluent is concerned, higher temperatures result in less loss of calcium hydroxide in the supernatant liquors because of the inverse solubility of calcium hydroxide.

The slaked lime and caustic bleach extract are permitted to react for a period of 5–30 minutes.

The underow from the thickener generally contains from 5 to 15% solids. This slurry is then dewatered to raise the solids content to about 40–60%.

In the preferred practice of the invention the filter cake is added to a volume of green liquor generally heated to a temperature of 180–210° F. containing an amount of sodium carbonate substantially stoichiometrically equivalent to the weight of the calcium hydroxide. The mixture is maintained at a temperature of 180–210° F. with agitation for a period of time sufficient to allow the following reaction to occur:

$$Ca(OH)_2 + NA_2CO_3 \rightarrow 2NaOH + CaCO_3$$

The filtrate resulting from the above reaction contains the organic color bodies. This filtrate is generally known as white liquor and is used in the pulp digesters. It has been our experience that the presence of additional organic matter in the white liquor from the bleach effluents does not interfere with its use in the digestion process and that the white liquor may be used according to current conventional practice.

Table I describes the alkaline or caustic bleach effluent subjected to color removal.

TABLE I
*Kraft Bleach Plant Caustic Stage Effluent*

| | Avg. |
|---|---|
| Flow, gal./ton pulp | 5875 |
| Color, p.p.m. | 8710 |
| Organic carbon, lbs./ton pulp | 26.7 |
| Total solids, percent | 0.32 |
| Volatile solids, percent of total solids | 48.9 |
| B.O.D., p.p.m. | 200 |
| Chlorides, p.p.m. | 870 |
| CaO, p.p.m. | 75 |
| Sulfate, p.p.m. | 305 |

Table II gives data showing color removal and biological oxygen demand removal (B.O.D.) from the bleach effluent.

TABLE II
*Color Removal By Lime*

| | Avg. |
|---|---|
| Lime, lbs./ton pulp | 555 |
| Lime dose, p.p.m. CaO | 20,535 |
| Temperature, °F | 116 |
| Supernatant color, p.p.m. | 760 |
| Color removal, percent | 92 |
| Supernatant B.O.D., p.p.m. | 105 |
| B.O.D. removal, percent | 46.9 |
| Lime loss, p.p.m. CaO | 795 |
| Chloride in supernatant, p.p.m. | 825 |

Figure 2:
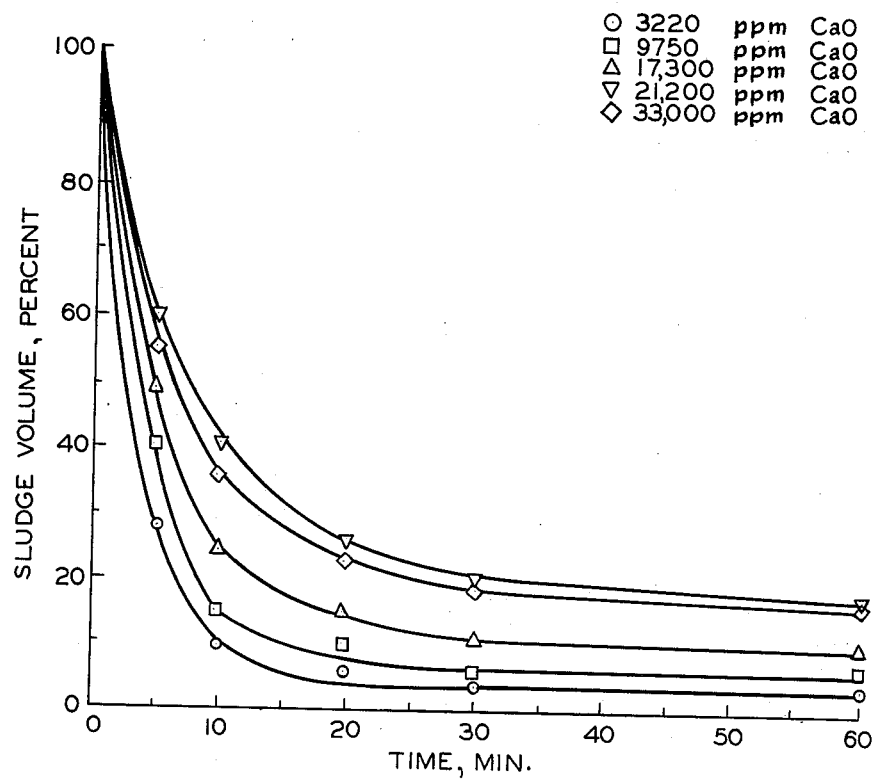

FIG. 2 gives typical settling curves for lime-organic sludges over a wide range of lime doses. The data show that the sludges settle rapidly and compact to 25% of volume in less than one hour.

Our experience has been that the dewatering characteristics of the lime-organic sludge is satisfactory. The underflow from the thickener may be rapidly filtered to a filter cake of 40 to 50% solids.

As noted above, the presence of organic material in the white liquor does not interfere with the digestion of the pulp. The range of active alkali obtained by causticizing lime-organic sludge is typical of mill practice. No significant differences in the pulps produced were observed in pine chips when cooked with organic containing white liquor.

The following example sets forth the conditions and quantities used in processing caustic bleach effluent on the basis of 100 tons per day of bleached pulp.

EXAMPLE

To 352,500 gallons of caustic bleach effluent (7300 p.p.m., organic color bodies) from the kraft pulp bleaching operation were added 56,000 pounds of lime which had been slaked with 15,850 gallons of caustic bleach effuent. The lime-caustic effluent slurry was maintained at a temperature of 100–150° F. for a period of 10 minutes. The slurry was then passed to a thickener and a filter. 345,630 gallons of supernatant liquor is produced from the thickener and the filter. The resulting filter cake, containing 60% solids, is added to 130,000 gallons of green liquor at a temperature of 200° F. resulting in 128,000 gallons of white liquor. The lime mud cake represented 96,000 pounds of calcium carbonate on a dry basis.

The foregoing process provides a method for satisfactorily removing upward of 90% of the organic color bodies in the kraft bleach effluents, as well as diminishing the B.O.D. requirement of said effluents in amounts up to 60% of the five day 20° C. B.O.D. demand. The process can be incorporated into the existing causticizing operation for generation of white liquor without substantial variance of existing procedures. Finally, the incorporation of the organic color removal step does not interfere with other operations in the kraft process.

We claim:

1. In a method for the production of bleached wood pulp including broadly the steps of digesting the raw wood according to the kraft process and subsequently bleaching said digested wood to thereby produce a bleached pulp and a spent bleach liquor, said kraft process including more specifically the steps of digesting the wood in a kraft white liquor (sodium hydroxide and sodium sulfide) to thereby produce a wood pulp and spent digestion liquor (black liquor), concentrating said black digestion liquor by evaporation and burning in the black liquor recovery furnace to produce a smelt (inorganic salts), dissolving the smelt in an aqueous liquor to yield a green liquor, and causticizing the green liquor with lime to produce a white liquor, the improvement in ridding the spent bleach liquor of organic color bodies which comprises treating the spent bleach liquor containing the organic color bodies with lime thereby to adsorb said color bodies on said lime, separating the lime from a substantial portion of the treated spent bleach liquor, reacting the separated lime and green liquor from the kraft digestion process for a period of time sufficient to convert a substantial amount of the sodium carbonate present in the green liquor to sodium hydroxide and calcium carbonate and to dissolve the color bodies in the aqueous sodium hydroxide solution (white liquor), separating the aqueous hydroxide solutions from the lime-calcium carbonate solids, passing the white liquor to the pulp digesters and subsequently passing the black liquor resulting from the digestion process to the black liquor recovery furnace wherein the organic color bodies are burned and destroyed.

2. The process of claim 1, wherein the slurry of bleach effluent and calcium hydroxide are maintained at temperatures ranging from ambient to boiling.

3. The process of claim 1, wherein calcium hydroxide is present in an amount of 3,000 to 33,000 parts of calcium hydroxide per million parts of effluent.

4. The process of claim 1, wherein an amount of green liquor is added to provide a substantially stoichiometric amount of sodium carbonate for reaction with the calcium hydroxide.

5. The process of claim 1, wherein the green liquor-calcium hydroxide reaction mass is maintained at a temperature of 180–212° F.

References Cited in the file of this patent

UNITED STATES PATENTS

| 1,847,111 | Hooker | Mar. 1, 1932 |
| 2,072,177 | Moore | Mar. 2, 1937 |
| 2,247,584 | Murdock | July 1, 1941 |